(12) United States Patent
Kim

(10) Patent No.: US 7,554,690 B2
(45) Date of Patent: Jun. 30, 2009

(54) ARRAY TYPE INKJET PRINTER SYSTEM INCLUDING PRINT HEAD, RESOLUTION ADJUSTING UNIT, RENDERING UNIT AND SCALER

(75) Inventor: Young-gu Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 11/485,479

(22) Filed: Jul. 13, 2006

(65) Prior Publication Data

US 2007/0052747 A1   Mar. 8, 2007

(30) Foreign Application Priority Data

Sep. 6, 2005   (KR) .................... 10-2005-0082812

(51) Int. Cl.
G06K 15/02   (2006.01)

(52) U.S. Cl. .................... 358/1.2; 358/528; 358/502; 358/1.9; 347/13; 347/42; 347/2; 347/3; 347/9; 347/10; 347/11; 347/12; 347/14; 347/19; 347/16; 347/40

(58) Field of Classification Search ............ 358/1.2, 358/1.9, 528, 451, 502; 347/20, 40, 19, 2–3, 347/9–14, 16, 42
See application file for complete search history.

(56) References Cited

U.S. PATENT DOCUMENTS

| | | | | |
|---|---|---|---|---|
| 4,300,846 A | * | 11/1981 | Rose et al. | 400/124.11 |
| 5,282,057 A | * | 1/1994 | Mailloux et al. | 358/445 |
| 6,019,448 A | * | 2/2000 | Yano et al. | 347/12 |
| 6,339,434 B1 | * | 1/2002 | West et al. | 345/667 |
| 6,406,111 B1 | * | 6/2002 | Klassen et al. | 347/9 |
| 6,530,639 B1 | * | 3/2003 | Matsuda | 347/15 |
| 6,608,699 B2 | * | 8/2003 | Kishimoto | 358/1.2 |
| 6,614,553 B2 | * | 9/2003 | Nakami et al. | 358/1.2 |
| 7,133,569 B1 | * | 11/2006 | Saquib | 382/262 |
| 7,215,345 B1 | * | 5/2007 | Hanko | 345/620 |
| 2002/0030762 A1 | * | 3/2002 | Kishimoto | 348/625 |
| 2002/0154182 A1 | * | 10/2002 | Takahashi et al. | 347/12 |
| 2005/0068354 A1 | * | 3/2005 | Oku | 347/10 |
| 2005/0243126 A1 | * | 11/2005 | Takahashi et al. | 347/40 |

FOREIGN PATENT DOCUMENTS

| | | |
|---|---|---|
| JP | 64-014049 | 1/1989 |
| JP | 05-201053 | 8/1993 |
| JP | 2004-202905 | 7/2004 |
| JP | 2004-299252 | 10/2004 |
| JP | 2004299252 A * | 10/2004 |

* cited by examiner

Primary Examiner—Twyler L Haskins
Assistant Examiner—Jacky X Zheng
(74) Attorney, Agent, or Firm—Stein McEwen, LLP

(57) ABSTRACT

An array type inkjet printer system having a print head with a plurality of nozzles formed therein in the horizontal scan direction includes a resolution adjusting unit for reducing a resolution in the horizontal scan direction of print data by a predetermined rate; a rendering unit for rendering the print data according to the resolution adjusted by the resolution adjusting unit; and a scaler for scaling the size of the rendered print data to be in correspondence to a resolution of the array type inkjet printer. Therefore, the number of operative nozzles at one time can be reduced, and therefore power consumption is reduced. This in turn opens up the possibility to use a small-sized, low-cost power supply unit.

9 Claims, 3 Drawing Sheets

ARRAY TYPE INKJET PRINTER SYSTEM INCLUDING PRINT HEAD, RESOLUTION ADJUSTING UNIT, RENDERING UNIT AND SCALER

CROSS-REFERENCE TO RELATED APPLICATIONS

This application claims the benefit under 35 U.S.C. § 119 of Korean Patent Application No. 2005-82812, filed on Sept. 6, 2005, in the Korean Intellectual Property Office, the disclosure of which is incorporated herein by reference.

BACKGROUND OF THE INVENTION

1. Field of the Invention

Aspects of the present invention relate in general to an array type inkjet printer system and a controlling method thereof. More specifically, aspects of the present invention relate to an array type inkjet printer system capable of preventing excessive power consumption and a controlling method thereof.

2. Description of the Related Art

Generally, an inkjet printer sprays miniscule droplets of ink from tiny nozzles at a recording medium such as a sheet of paper or film, in response to a control signal.

According to the print head driving method, inkjet printers may be classified into array type inkjet printers and print head driving type inkjet printers. In the print head driving inkjet printer, a plurality of nozzles are arranged on the print head in the vertical scan direction, and the printer prints one line at a time as the print head moves in the horizontal scan direction. On the other hand, in the array type printer, a plurality of nozzles are arranged in the horizontal scan direction of the print head so that it prints each line in the vertical scan direction, and the print head moves only in the vertical scan direction.

The array type inkjet printer head is provided with a nozzle plate having a plurality of nozzles formed therein. The array type inkjet printer head may have several thousands of nozzles according to the resolution or the design used. The energy consumption of an array type inkjet printer have a large number of nozzles can be considerable. For example, suppose that 1,200 droplets are to be formed in each line. Since a color printer supports four colors CMYK (cyan, magenta, yellow and key (black)), a total of 4,800 nozzles (1,200×4=4,800) must be formed in the print head. Although there are slight differences among printers, about 2 µJ of energy is usually required to operate one nozzle. If a line is printed at a frequency of 20 kHz, the power capacity required for printing a line is as follows:

Power capacity=4,800×2 µJ/(1/20,000)=192 W.

This power capacity is a total amount of power required for printing a line completely, provided that the nozzles for each of four colors are all operated at the frequency of 20 kHz. Here, four colors indicate CMYK colors, i.e., cyan, magenta, yellow, and key (black). Since a black color is typically obtained by mixing the other three colors, two of CMY colors are usually mixed to obtain desired colors. Thus, the average number of nozzles used is 2.1, and the power capacity required therefor is as follows:

Average power capacity required=192 W×(2.1/4)
=99.96 W.

In other words, the related art inkjet printer requires quite a lot of power, 99.96 W, for printing one line. Needless to say, a large size power supply unit must be installed in the printer to supply such a large amount of power, and this increases the cost overall.

Accordingly, there is a need to develop a method of reducing power consumption for array type inkjet printing.

SUMMARY OF THE INVENTION

It is, therefore, an aspect of the present invention to provide an array type inkjet printer system capable of handling print data with reduced power consumption, and a controlling method thereof.

Additional aspects and/or advantages of the invention will be set forth in part in the description which follows and, in part, will be obvious from the description, or may be learned by practice of the invention.

To achieve at least the above and/or other objects and advantages, there is provided an array type inkjet printer system comprising an array type inkjet printer having a print head with a plurality of nozzles formed therein in a horizontal scan direction, which the system includes: a resolution adjusting unit that reduces a resolution in the horizontal scan direction of print data by a predetermined rate; a rendering unit that renders the print data according to the resolution adjusted by the resolution adjusting unit; and a scaler that scales the size of the rendered print data to be in correspondence to a resolution of the array type inkjet printer.

In an exemplary, non-limiting embodiment, the resolution adjusting unit reduces the resolution in the horizontal scan direction by a predetermined rate, and increases a resolution in the vertical scan direction by a predetermined rate.

Preferably, but not necessarily, the resolution adjusting unit reduces the resolution in the horizontal scan direction by a factor of 1/n, and increases the resolution in the vertical scan direction by a factor of n.

In an exemplary, non-limiting embodiment, the scaler scales the print data in such a manner that some of the nozzles in the horizontal scan direction are in a non-operating status.

In an exemplary, non-limiting embodiment, the scaler scales the print data in such a manner that the nozzles in the non-operating status are arrayed in a regular pattern.

In an exemplary, non-limiting embodiment, the scaler scales the print data in such a manner that the nozzles in the non-operating status are arrayed in a regular pattern along the vertical scan direction.

In an exemplary, non-limiting embodiment, the printer includes: a nozzle control unit that determines whether to operate all the nozzles, according to the scaling result at the scaler; and a motor control unit that determines a driving speed of a motor driving a feeding roller by which a printing paper moves, according to the scaling result at the scaler.

Another aspect of the present invention provides a controlling method of an array type inkjet printer system having a print head with a plurality of nozzles formed therein in a horizontal scan direction, in which the method includes the steps of: reducing a resolution in the horizontal scan direction of print data by a predetermined rate; rendering the print data according to the resolution adjusted by the resolution adjusting unit; scaling the size of the rendered print data to be in correspondence to a resolution of the array type inkjet printer; and printing the print data at the adjusted resolution.

Another aspect of the present invention provides a method of printing in a power saving mode comprising selecting a power saving mode in an array type inkjet printer system having a print head with a plurality of nozzles formed therein in a horizontal scan direction, wherein the power saving mode provides that some of the nozzles are in a non-operating status during the printing; determining the nozzles that are to be in a non-operating status by reducing a resolution in the horizontal scan direction of print data by a predetermined rate, rendering the print data according to the reduced resolution, scaling the size of the rendered print data to be in correspondence with a resolution of the array type inkjet printer to obtain an adjusted resolution of the print data, wherein the scaling results in some of the nozzles in the horizontal scan direction being in a non-operating status; and printing the print data at the adjusted resolution.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
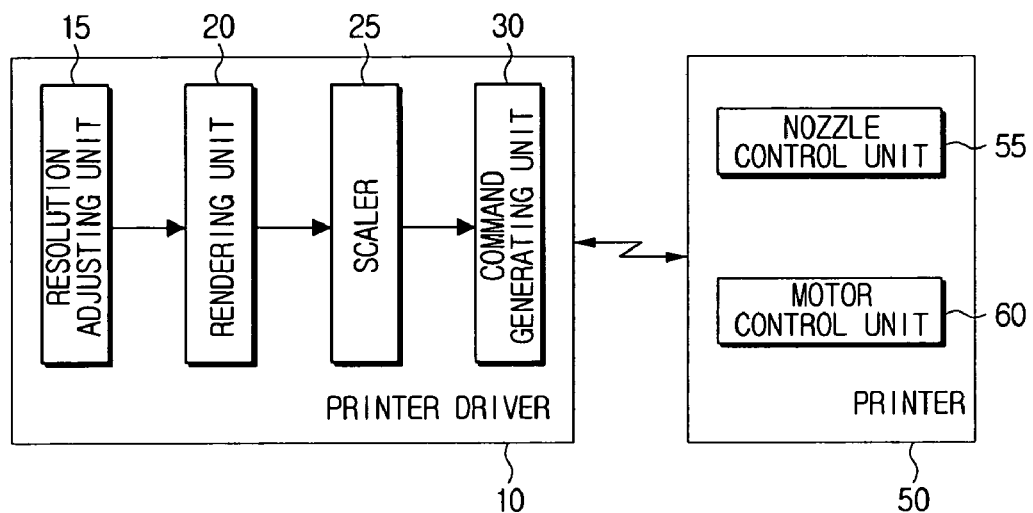
FIG. 1 is a schematic block diagram of an array type inkjet printer system according to one embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a schematic block diagram of an array type inkjet printer system according to one embodiment of the present invention. As depicted in the drawing, the array type inkjet printer system includes a printer driver 10 installed on a user terminal (server), and an array type inkjet printer 50.

The printer driver 10 comprises a resolution adjusting unit 15, a rendering unit 20, a scaler 25, and a command generating unit 30.

Generally, the printer driver 10 has information about the resolution of an image to be printed by the printer. The printer driver 10 supports resolutions based on the resolution of the printer used. For example, suppose that the resolution of a certain printer is 1,200 dpi in the horizontal scan direction and 1,200 dpi in the vertical scan direction. Then, the printer driver 10 supports resolutions such as, 1,200×2,400, 1,200× 3,600 or 900×900, 900×1,200, 900×2,400, or 600×1,200, 600×2,400, etc.

The resolution adjusting unit 15 adjusts the resolution of print data to be rendered at the user terminal on the basis of the resolution of the printer, if a user selects a power save mode with a lower power discharge. In detail, the resolution adjusting unit 15 reduces the resolution in the horizontal scan direction, and increases the resolution in the vertical scan direction. For example, the resolution adjusting unit 15 may adjust the resolution in the horizontal scan direction to be half of the resolution of the printer and adjust the resolution in the vertical scan direction to be twice the resolution of the printer.

For example, if the resolution of the printer is 1,200×1,200, then the resolution adjusting unit 15 adjusts the resolution so that print data may be rendered at a resolution of 600×2,400. Therefore, if the resolution adjusting unit 15 reduces the resolution in the horizontal scan direction to be half of the resolution of the printer, and increases the resolution in the vertical scan direction to be twice the resolution of the printer, the resolution in the horizontal direction is reduced. However, since a reduced resolution in the horizontal direction is offset by an increased resolution in the vertical direction, the entire resolution is not reduced.

In short, if the resolution adjusting unit 15 reduces the resolution in the horizontal scan direction by a factor 1/n, it should increase the resolution in the vertical scan direction by a factor of n, which is an inverse of the factor of the resolution in the horizontal scan direction.

Figure 2:
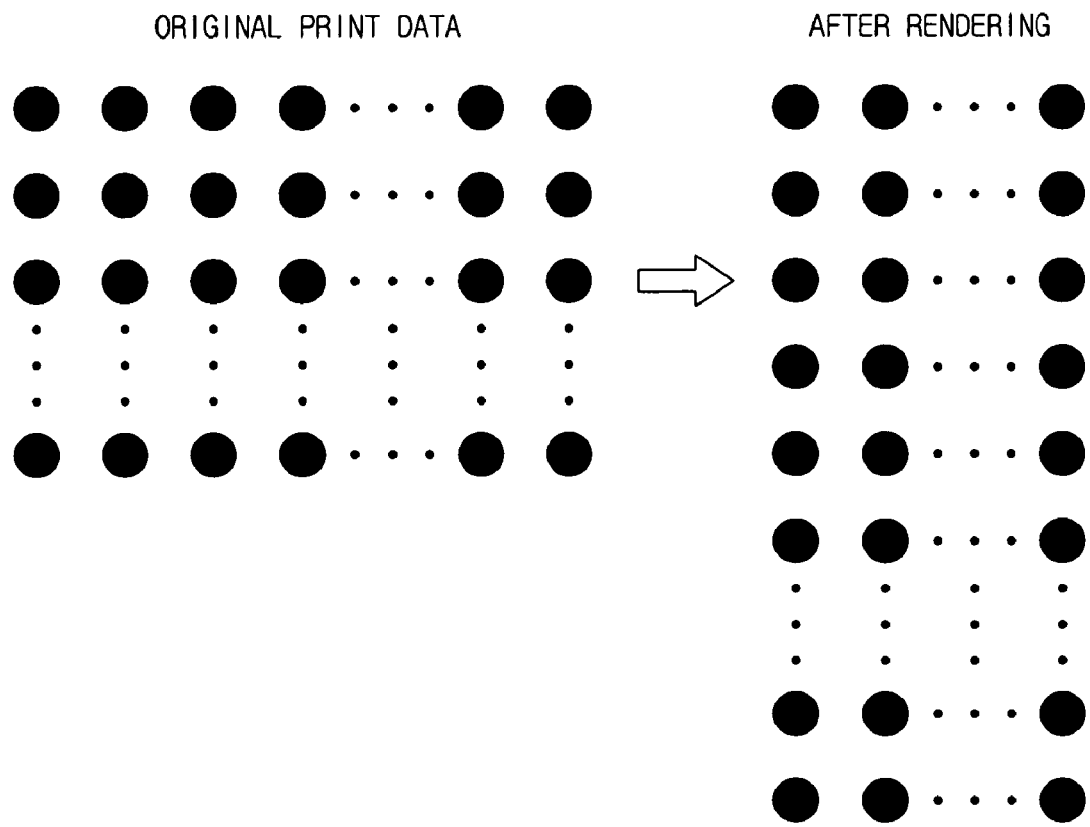
FIG. 2 illustrates an ideal format of print data converted through a rendering process performed by a rendering unit in FIG. 1.

The rendering unit 20 renders print data at a resolution set by the resolution adjusting unit 15, and converts the data into bit map data. For example, if the resolution adjusting unit 15 reduces the resolution in the horizontal scan direction to half and doubles the resolution in the vertical scan direction, the print data rendered by the rendering unit 20 would have a half width in the horizontal scan direction and a doubled width in the vertical scan direction, as shown in FIG. 2. Since the width in the horizontal scan direction of the rendered data is reduced as much as the resolution decrement, the resolution of the actual print data is not changed. In effect, the resolution of the print data is reduced at the scaler 25.

The scaler 25 changes the print data in bit-map format to a size that the printer can support, i.e., a resolution at which the data is actually printed. To change the size of the print data to a size supported by the original resolution of the printer, the scaler 25 increases the print data's width in the horizontal scan direction by an inverse number of the resolution decrement adjusted at the resolution adjusting unit 15, and decreases the print data's width in the vertical scan direction by an inverse number of the resolution increment adjusted at the resolution adjusting unit 15. For instance, suppose that the resolution adjusting unit 15 reduced the resolution in the horizontal scan direction to half, and doubled the resolution in the vertical scan direction. Then, the scaler 25 doubles the print data's width in the horizontal scan direction, and reduces the print data's width in the vertical scan direction to half.

Figure 3:
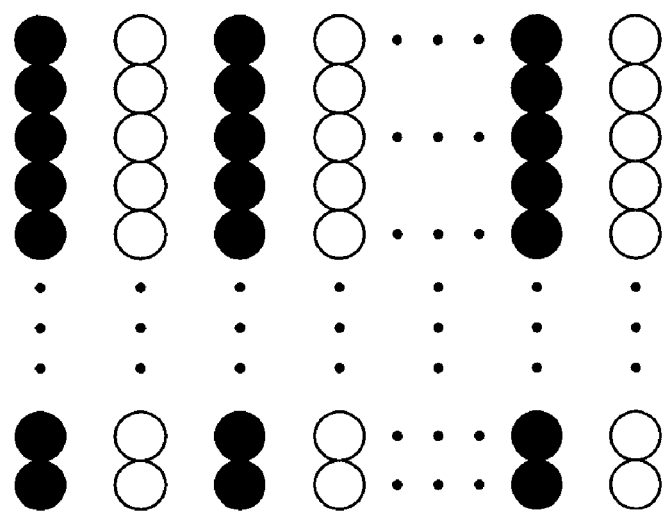
FIGS. 3 and 4 illustrate, respectively, an ideal format of print data converted through a scaling process performed by a scaler in FIG. 1.
Figure 4:
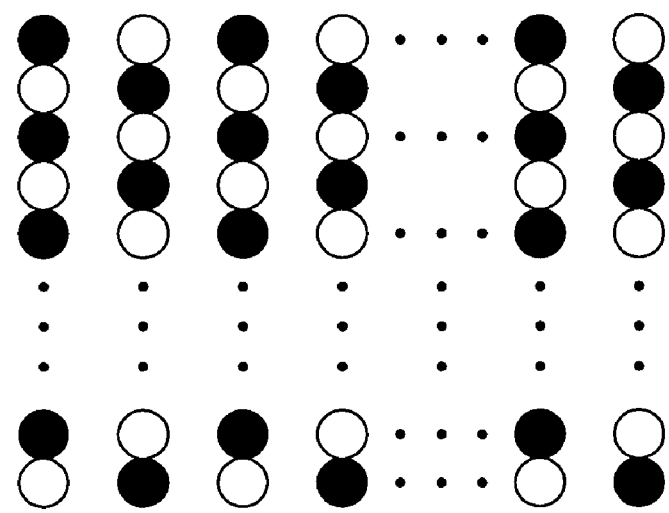

Moreover, when doubling the print data's width in the horizontal scan direction, the scaler 25 reduces the number of nozzles spraying ink during the printing operation to half. In detail, it adjusts the space between a nozzle that sprays ink and a nozzle that does not spray ink to be uniform or have a predetermined pattern or regulation. Further to the above-described example, suppose that 1,200 nozzles are formed in the print head, and the resolution of the printer is 1,200 dpi. In such case, if the scaler 25 doubles the print data's width in the horizontal scan direction, a maximum of 600 nozzles out of 1,200 are operated. At this time, the scaler 25 increases the print data's width in the horizontal scan direction so as to array those 600 nozzles spraying ink in an alternate pattern, while scaling the print data's width so that each column in the the vertical scan direction has the same type of nozzle, as illustrated in FIG. 3. It is also possible for the scaler 25 to scale the print data's width so that the nozzles spraying ink are arrayed alternately along the vertical scan direction as illustrated in FIG. 4.

The command generating unit 30 converts the print data that has been size-adjusted at the scaler 25 into a print data with a command that the target printer recognizes. The print data is provided to the printer after it is converted into print data with a command.

The array type inkjet printer 50 includes a nozzle control unit 55 that controls the operation of a plurality of nozzles formed in the print head, and a motor control unit 60 that controls the operation of a feeding roller where printing paper is mounted.

The nozzle control unit 55 selectively operates the nozzles according to the resolution in the horizontal scan direction of the print data provided from the printer driver 10. In detail, the nozzle control unit 55 controls the operation of each nozzle according to the resolution in the horizontal scan direction, and, if the resolution in the horizontal scan direction is reduced to 600 dpi and adjusted by the scaler 25 as described above, controls each nozzle to alternately operate. If the resolution in the horizontal scan direction is reduced by a predetermined rate, the nozzle control unit 55 does not have to operate all 1,200 nozzles of the print head. As the number of nozzles spraying ink at one time is reduced, the power consumption for driving the nozzles is also reduced.

The motor control unit 60 controls the driving speed of the feeding roller according to the resolution in the vertical scan direction of the print data provided from the printer driver 10. If the resolution in the vertical scan direction of the print data is high, the motor control unit 60 reduces the driving speed of the feeding roller, so that the ink discharge frequency along the vertical scan direction may be increased and therefore the resolution can be improved by the reduced discharge interval. Meanwhile, if the resolution in the vertical scan direction of the print data is low, the motor control unit 60 increases the driving speed of the feeding roller, so that the ink discharge frequency along the vertical scan direction may be reduced and therefore the resolution can be reduced.

Figure 5:
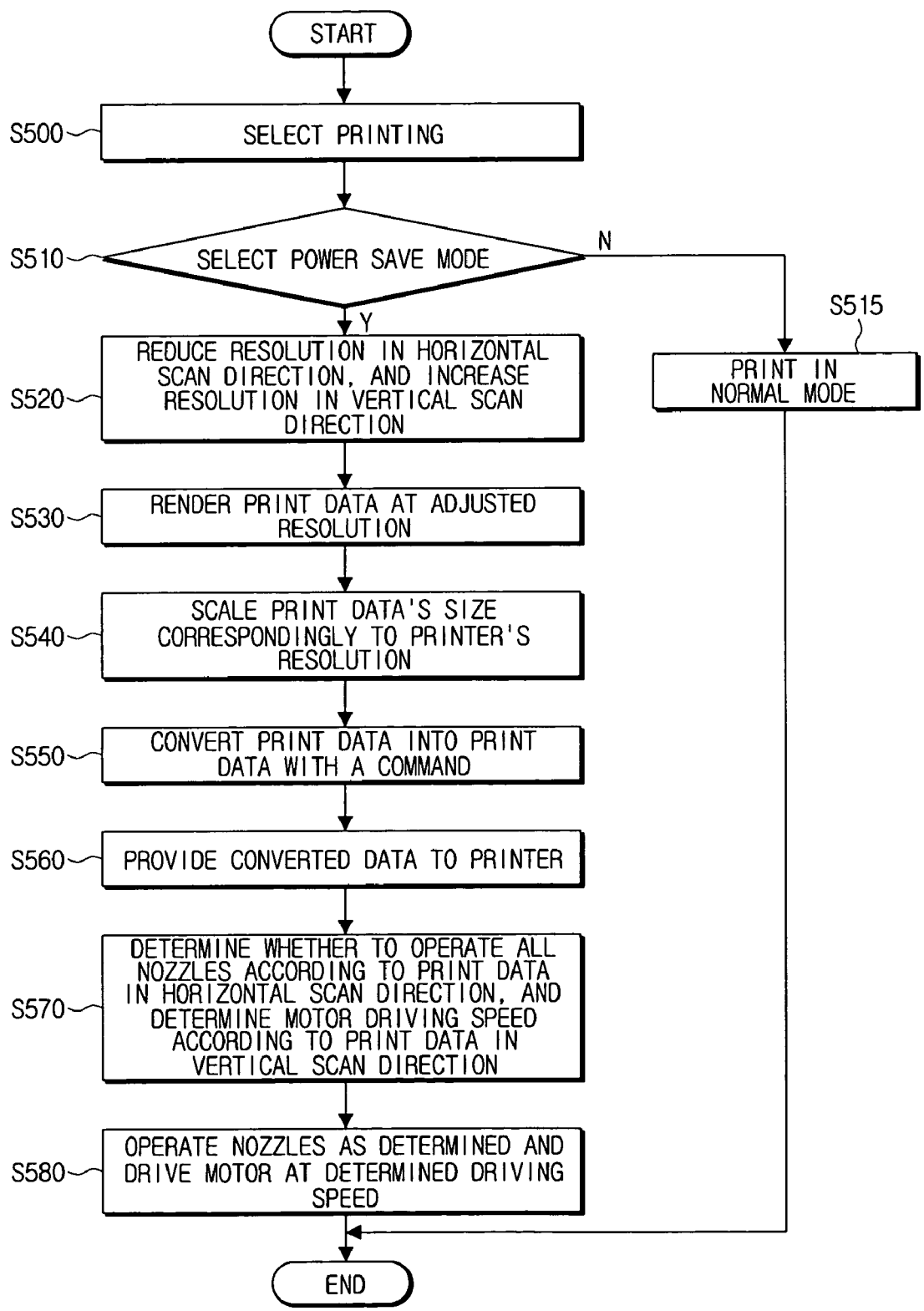
FIG. 5 is a flow chart describing the printing procedure performed by an array type inkjet printer system of FIG. 1.

With reference to FIG. 5, the following now explains a printing procedure executed in the array type inkjet printer system with the above-described configuration.

When a document is prepared in the user terminal and the power save mode is selected (S500, S510:Y), the resolution adjusting unit 15 of the printer driver 10 adjusts the resolution of the print data in the horizontal scan direction and in the vertical scan direction, respectively, according to a predetermined adjustment rate. As a non-limiting example, the resolution in the horizontal scan direction is reduced at a predetermined rate, and the resolution in the vertical scan direction is multiplied by an inverse of the factor used for the resolution in the horizontal scan direction (S520). (If the user did not select the power save mode, the printer system prints the document in the normal mode as usual (S515).)

Next, the rendering unit 20 renders the print data according to the resolution adjusted by the resolution adjusting unit 15 (S530). Since the resolution in the horizontal scan direction was reduced and the resolution in the vertical scan direction was increased, the print data's width in the horizontal scan direction is reduced and the print data's width in the vertical scan direction is increased. The size of the print data is adjusted by the scaler 25, correspondingly to the resolution of the printer (S540). That is, the scaler 25 increases the print data's width in the horizontal scan direction in correspondence to the resolution of the printer. When increasing the print data's width in the horizontal scan direction, the scaler 25 adjusts the print data by controlling the nozzles to alternately operate as shown in FIGS. 3 and 4.

The print data whose size has been adjusted by the scaler 25 is converted to print data with a command that the printer can recognize and then is provided to the printer (S550, S560).

The nozzle control unit 55 of the printer determines whether to operate all of the nozzles of the print head according to the resolution of the print data in the horizontal scan direction scaled by the scaler 25, and the motor control unit 60 controls the driving speed of the feeding roller motor to be in correspondence with the resolution of the print data in the vertical scan direction (S570). Afterwards, the nozzle control unit 55 operates the number of nozzles determined (or selected) for spraying ink droplets, and the motor control unit 60 drives the motor at a determined driving speed (S580).

Therefore, the array type inkjet printer system of the present invention can reduce the number of nozzles that are operative at the same time by reducing the resolution of the print data in the horizontal scan direction and increasing the resolution of the print data in the vertical scan direction. As the number of operative nozzles is reduced, power consumption can be reduced also. This in turn makes it possible to reduce the capacity of the power supply unit installed in the printer, and therefore a relatively small-sized, low-cost power supply unit can be used.

In conclusion, the array type inkjet printer system of the present invention can be advantageously used for reducing power consumption by reducing the number of operative nozzles at one time, and opens up the possibility of using a small-sized, low-cost power supply unit with low capacity.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An array type inkjet printer system comprising:
   a print head having a plurality of nozzles formed therein in the horizontal scan direction, wherein a printing resolution of the array type inkjet printer system in a horizontal scan direction is defined by the plurality of nozzles formed in the print head in the horizontal scan direction, such that in a printing operation, the print head and/or a recording medium move relative to each other only in a vertical scan direction;
   a resolution adjusting unit that reduces a resolution of print data in the horizontal scan direction by a predetermined rate;
   a rendering unit that renders the print data according to the print data resolution adjusted by the resolution adjusting unit; and
   a scaler that scales the rendered print data such that a width of the scaled print data in the horizontal scan direction corresponds with the printing resolution of the array type inkjet printing system in the horizontal scan direction and such that when the scaled print data is printed, some of the nozzles in the horizontal scan direction are in a non-operating status.

2. The system of claim 1, wherein the resolution adjusting unit reduces the print data resolution in the horizontal scan direction by a first predetermined rate and increases a print data resolution in a vertical scan direction by a second predetermined rate.

3. The system of claim 1, wherein the resolution adjusting unit reduces the print data resolution in the horizontal scan direction by a factor of 1/n, and increases the print data resolution in a vertical scan direction by a factor of n.

4. The system of claim 3, wherein the scaler increases a width of the print data in the horizontal scan direction by an inverse of the factor by which the print data resolution in the horizontal scan direction was decreased by the resolution adjusting unit and decreases a width of the print data in the vertical scan direction by an inverse of the factor by which the print data resolution in the vertical scan direction was increased by the resolution adjusting unit.

5. The system of claim 4, wherein the array type inkjet printer comprises:
- a nozzle control unit that determines whether to operate all the nozzles, according to the scaling result at the scaler;
- a feeding roller that moves a printing medium;
- a motor that drives the feeding roller; and
- a motor control unit that determines a driving speed of the motor driving the feeding roller, according to the scaling result at the scaler.

6. The system of claim 1, wherein the resolution adjusting unit reduces the print data resolution in the horizontal scan direction by one-half and increases the print data resolution in a vertical scan direction by a factor of 2.

7. The system of claim 1, wherein the scaler scales the print data such that when the scaled print data is printed, the nozzles that are in the non-operating status are determined according to a predetermined pattern.

8. The system of claim 7, wherein the scaler scales the print data in such manner that when the scaled print data is printed, the nozzles that are in the non-operating status determined according to a predetermined pattern along the vertical scan direction.

9. An array type inkjet printer system comprising:
- a print head having a plurality of nozzles formed therein in the horizontal scan direction, wherein a printing resolution of the array type inkjet printer system in a horizontal scan direction is defined by the plurality of nozzles formed in the print head in the horizontal scan direction, such that in a printing operation, the print head and/or a recording medium move relative to each other only in a vertical scan direction;
- a resolution adjusting unit that reduces a resolution of print data in a horizontal scan direction by a factor of 1/n, and increases a resolution of the print data in a vertical scan direction by a factor of n;
- a rendering unit that renders the print data according to the resolution adjusted by the resolution adjusting unit; and
- a scaler that scales the rendered print data to increase a width of the print data in the horizontal scan direction by an inverse of the factor by which the print data resolution in the horizontal scan direction was decreased by the resolution adjusting unit and to decrease a width of the print data in the vertical scan direction by an inverse of the factor by which the print data resolution in the vertical scan direction was increased by the resolution adjusting unit such that when the scaled print data is printed, some of the nozzles in the horizontal scan direction are in a non-operating status.

* * * * *